UNITED STATES PATENT OFFICE.

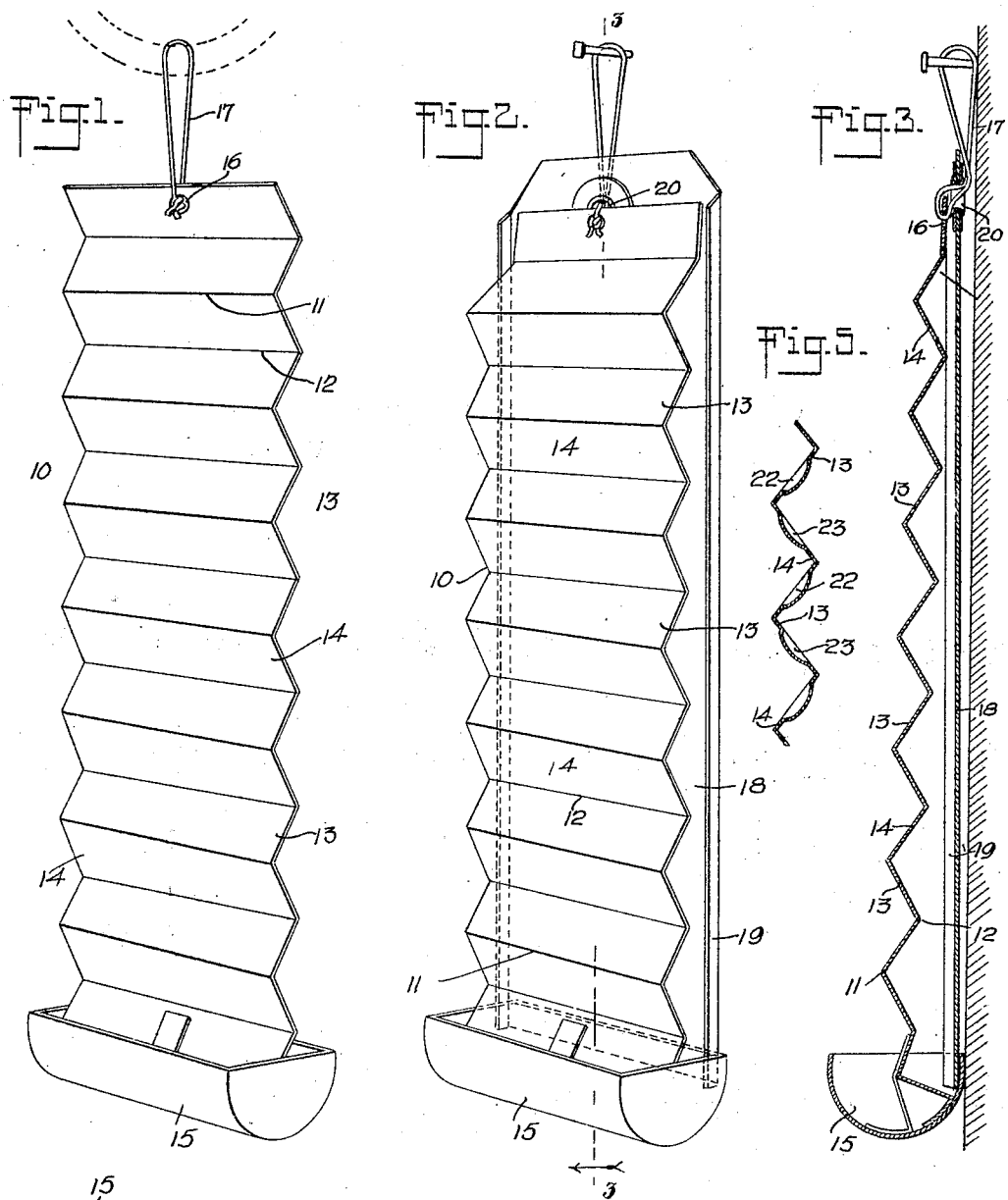

FREDERICK PFEIFFER, SR., OF BROOKLYN, NEW YORK.

INSECT CATCHER AND DESTROYER.

1,411,931.  Specification of Letters Patent.  Patented Apr. 4, 1922.

Application filed January 20, 1921. Serial No. 438,711.

*To all whom it may concern:*

Be it known that I, FREDERICK PFEIFFER, Sr., a citizen of the United States, and a resident of the city of New York, borough of Brooklyn, in the county of Kings and State of New York, have invented a new and Improved Insect Catcher and Destroyer, of which the following is a full, clear, and exact description.

This invention relates to insect catching and destroying devices and has particular reference to a means for entangling and holding the insect when it alights thereon.

The principal object of the present invention is to produce a device of the character set forth which is adapted to various uses and which provides a maximum catching surface in a minimum space.

Another object of the invention resides in the provision of a device of this character which is foldable for shipment into a compact package to occupy a minimum amount of space.

A further object of the invention is to provide an extremely simple, and inexpensive device of this character which renders it especially adaptable for use as an advertising medium.

With the above recited and other objects in view, some of which will appear more clearly hereafter, the invention resides in the novel construction, combination and arrangement of parts set forth in the following specification, pointed out in the appended claims and illustrated in the accompanying drawings, in which;

Figure 1 is a perspective view of the device illustrating one of its uses.

Figure 2 is a similar view illustrating another manner in which the same may be used.

Figure 3 is a vertical sectional view therethrough taken approximately on the line 3—3 of Figure 2.

Figure 4 is a similar view illustrating another manner in which the device may be used.

Figure 5 is a sectional view illustrating a modified form of the invention.

Figure 6 is a similar view thereof illustrating the manner in which the same is folded and nested.

Referring to the drawings by characters of reference, 10 designates a sheet of cheap material which is scored and folded along the parallel lines 11 and 12 to provide a plurality of oppositely disposed plaits or folds 13 and 14, said plaits being of substantially the same width. The opposite faces of said plaits are coated or treated with a gummy substance which functions as a bait and an adhesive for entangling the insect which alights thereon or contacts therewith. The lowermost plait is secured within an open sided container 15 which is here illustrated of semi-cylindrical formation but which it is to be understood may be of any desired contour. The uppermost plait is apertured as at 16 for the reception of a suitable loop 17 which affords means for suspending the device from a suitable support. The container 15 is of sufficient size to house the sheet 10 when the plaits thereof are in folded condition and if desired a cover may be employed to fit over the open side of the container when the article is being shipped or stored. As illustrated in Figure 1 of the drawings when the loop is engaged over a suitable support, and the plaits are extended, the container will be suspended beneath the sheet to afford a receptacle for the gummy substance, should the same become liquefied under severe heat.

As illustrated in Figure 2 of the drawings, the sheet 10 may be employed in connection with a suitable backing card 18, the side edges of which are preferably folded to provide a stiffening flange 19. The backing card is apertured as at 20 adjacent the upper extremity to receive the loop member 17 and the lower extremity of the card in this instance is designed to be inserted within the open side of the container 15, to frictionally engage the end walls thereof. By this arrangement the device may be suspended and supported against a wall without the possibility of the gummy substance contacting therewith and when the outer surface of the plaits 13 and 14 have become filled with insects the backing card may be removed and arranged on the opposite side. The sheet and receptacle when used in connection with the backing card may be disposed horizontally on a suitable supporting surface, the intervening spaces 21 between the inner surfaces of the plaits and the backing card defining compartments for trapping insects in addition to the outer or upper surface of the sheet.

In the modification illustrated in Figures 5 and 6 of the drawings the plaits 13 and 14 are provided with depressions 22 and 23 respectively formed in the inner and outer faces which constitute receptacles for liquid bait which may be poured thereover after the device is arranged in suspended position. From Figure 6 of the drawings it will be noted that the depressions will nest snugly in each other when the sheet is folded.

From the foregoing it will be seen that a simple and effective insect catching and destroying device is provided which is capable of various uses and which affords sufficient space and which may be produced at a sufficiently low cost to warrant its use as an advertising medium.

While there has been illustrated and described several preferred embodiments of the invention, no limitation is necessarily made to the precise structural details as it is to be understood that variations and modifications properly falling within the scope of the appended claims may be resorted to when found expedient.

I claim:

1. An insect catcher and destroyer comprising a plaited or foldable strip, the opposite surfaces of which are coated with a gummy substance constituting an adhesive bait, an open sided container within which one extremity of said strip is secured into which the same is foldable and from which it may be withdrawn, and means engageable respectively with the free end of the strip and the container for holding the strip distended.

2. An insect catcher and destroyer comprising a strip of thin material plaited to provide a foldable member, the opposite surfaces of which are coated with a gummy substance constituting an adhesive bait, an open sided container in which one extremity of said strip is secured into which the same is adapted to be folded and nested and from which the same may be withdrawn to support and suspend the device from the free end of the strip with the container disposed therebeneath, and means engageable respectively with the free end of the strip and the container for holding the strip distended.

3. An insect catcher and destroyer consisting of a strip of thin material plaited to provide a foldable member having its opposite faces coated with a gummy, adhesive substance constituting a bait, an open sided container within which one extremity of said sheet is secured, into which the said sheet is adapted to be nested and from which the same may be withdrawn, a flexible looped element secured to the opposite extremity for suspending the sheet vertically with the container disposed therebeneath to constitute a receptacle to receive the gummy substance liquefied under the action of heat, and means engageable respectively with the free end of the strip and the container for holding the strip distended.

4. An insect catcher and destroyer consisting of a strip of thin material plaited to provide a foldable member having its opposite faces coated with a gummy, adhesive substance constituting a bait, an open sided container within which one extremity of said sheet is secured, into which the said sheet is adapted to be nested and from which the same may be withdrawn, a flexible looped element secured to the opposite extremity for suspending the sheet vertically with the container disposed therebeneath to constitute a receptacle to receive the gummy substance liquefied under the action of heat, in combination with a backing card having an aperture at one extremity through which the looped element is passed, the opposite extremity of said card adapted to fit into and frictionally engage said container.

FREDERICK PFEIFFER, Sr.